United States Patent [19]

Poovaiah et al.

[11] 4,331,691
[45] May 25, 1982

[54] VACUUM PRESSURE INFILTRATION PROCESS FOR FRESH PRODUCE

[75] Inventors: Bachettira W. Poovaiah, Pullman; Gary A. Moulton, Mt. Vernon, both of Wash.

[73] Assignee: Washington State University Research Foundation, Inc., Pullman, Wash.

[21] Appl. No.: 168,438

[22] Filed: Jul. 10, 1980

[51] Int. Cl.³ .............................................. A23B 7/16
[52] U.S. Cl. .................................... 426/302; 426/308; 426/321; 426/615; 426/506; 99/472
[58] Field of Search ............... 426/302, 308, 309, 310, 426/321, 331, 333, 335, 250, 251, 252, 532, 540, 615, 616, 486, 506

[56] References Cited

U.S. PATENT DOCUMENTS

| | | | |
|---|---|---|---|
| 1,585,370 | 5/1926 | Brogden | 426/308 |
| 1,637,068 | 7/1927 | Willison | 426/506 |
| 1,700,908 | 2/1929 | Ricketts | 426/308 |
| 2,415,995 | 2/1947 | Derby | 426/302 |
| 3,008,838 | 11/1961 | Brunsing et al. | 426/302 |
| 3,843,810 | 10/1974 | Fehmerling | 426/615 |
| 4,143,167 | 3/1979 | Blanchaud et al. | 426/302 |

FOREIGN PATENT DOCUMENTS 2412263  8/1979  France ................................ 426/302

*Primary Examiner*—Raymond N. Jones
*Assistant Examiner*—George C. Yeung
*Attorney, Agent, or Firm*—Wells, St. John & Roberts

[57] ABSTRACT

A system for pressure infiltration of liquid through the skin of fresh produce. The produce is subjected to vacuum pressure, and then coated with the liquid without submersion while continuing to subject the produce to the vacuum pressure. The application of liquid is continued as the vacuum pressure is progressively released to return the pressure surrounding the produce to atmospheric conditions, thereby causing the liquid to be forced through the produce skin surfaces due to the increase in exterior pressure about it. The coating apparatus is a combination of yieldable support rollers and an overhead spray. The rollers are partially immersed in a liquid bath from which liquid is recirculated to the spray nozzles.

5 Claims, 3 Drawing Figures

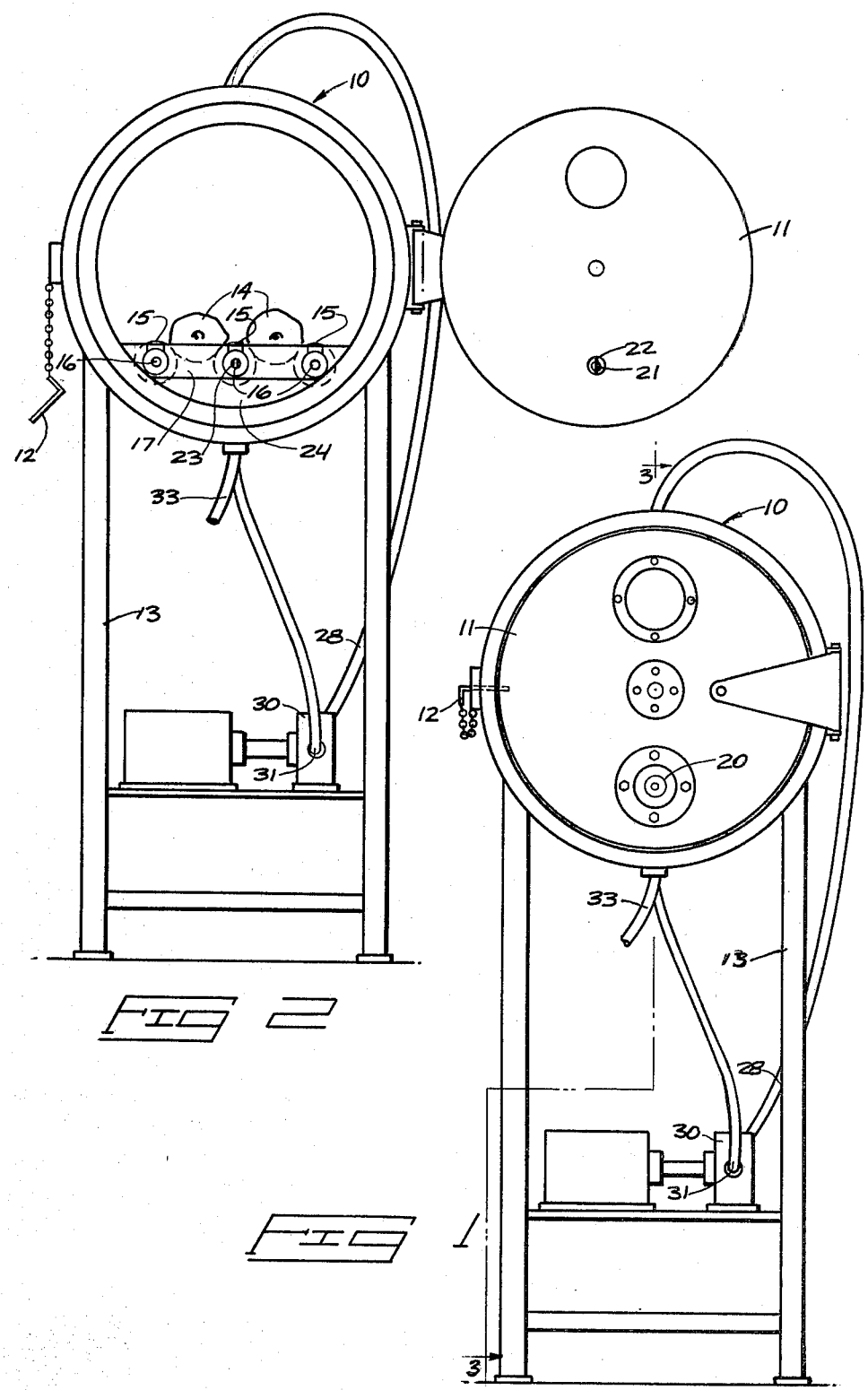

VACUUM PRESSURE INFILTRATION PROCESS FOR FRESH PRODUCE

BACKGROUND OF THE INVENTION

This disclosure relates generally to the surface infiltration of liquids into produce, specifically whole fresh fruits and vegetables. Fresh produce as used herein shall refer to any intact, whole fruit or vegetable product, whether freshly picked or taken from storage without processing such as freezing, or canning. It is directed to pressure penetration using vacuum pressure techniques. It offers an alternative to prior systems in which fruits and vegetables have been pressure treated while immersed in a liquid tank.

The present system was developed specifically in relation to calcium treatments to enhance the firmness qualities of fresh apples. Infiltration of the porous skins of apples by calcium chloride solutions has been found to improve firmness of the fruit through storage and also controls a common aging phenomenon known as "bitter pit". Treated apples have also been found to be less susceptible to bruising.

While the benefits of pressure infiltration of chemicals through the skins of whole fresh fruits and vegetables have been demonstrated, practical difficulties have arisen in identifying effective infiltration techniques, particularly with respect to open calyx fruits. When such fruits, such as Golden Delicious apples, were treated with calcium chloride while immersed in a pressure tank, there was a significant increase in calcium absorption through the calyx end. This caused waterlogging in the core area of the fruit and specifically led to the development of the present system as an alternative treatment procedure.

In the present system, the produce is first subjected to vacuum pressure. While the vacuum pressure is maintained, their surfaces are wetted by a liquid spray, by engagement by wetted yieldable rollers, or by both. The application of the liquid is continued during release of the vacuum pressure. The resulting pressure increase effectively forces the liquid through the pores of the skin surrounding the fruit or vegetable without any significant variations in liquid uptake at the calyx end, if present.

DESCRIPTION OF THE DRAWINGS

FIG. 1 is a front elevation view of the treating apparatus;

FIG. 2 is a front elevation view with the cover in an open position; and

DESCRIPTION OF THE PREFERRED EMBODIMENT

Figure 3:
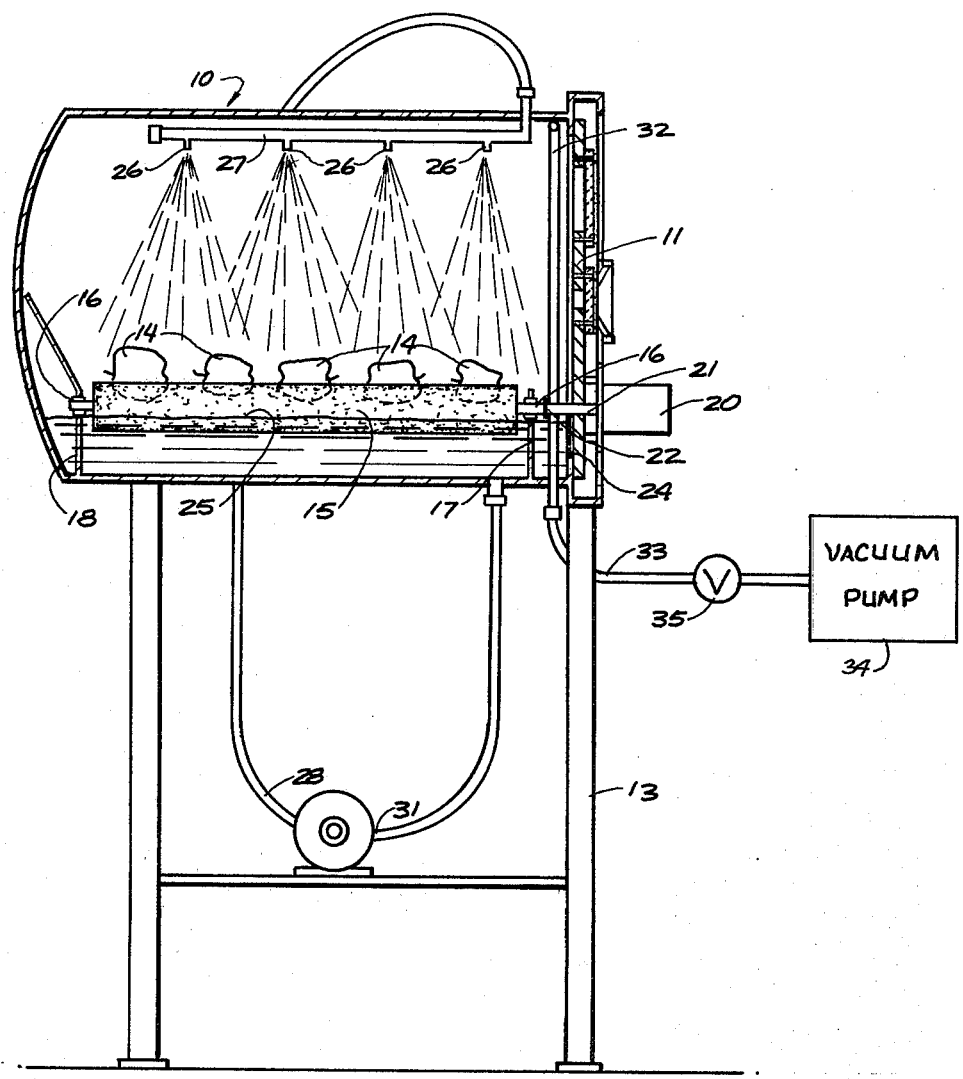
FIG. 3 is a sectional view taken along line 3—3 in FIG. 1.

The drawings illustrate an exemplary apparatus for carrying out the present process of treating whole fresh fruits or vegetables by infiltration of a liquid through their skin. This process is particularly applicable to fruits and vegetables, such as apples, having porous skins through which liquid can be forced under pressure. However, it is also applicable to fruits or vegetables having skins sufficiently thick to permit physical perforation of the skin prior to this treatment. Such skins can be punctured by a plurality of small pins or needles to assist in the subsequent liquid penetration process.

While the details of this system will be described specifically in relation to treatment of apples, it is to be understood that it is generally applicable to the treatment of any whole fresh fruit or vegetable product having an intact skin or covering. This would include citrus fruits, tomatoes, pears, and other fruits or vegetables.

The process first requires washing of the produce either in plain water or in a suitable active substance. This removes surface dust, spray residues or other materials from the skin or covering surfaces which might otherwise interfere with liquid infiltration during this procedure.

The fruits or vegetables are supported on a suitable conveying means, such as rollers spaced side by side. The produce can remain at a working station and be treated on a batch basis, or can be moved from one station to the next for treatment in a continuous or intermittent system. The present disclosure describes specifically a pressure vessel for treatment of individual batches of fresh produce, but this disclosure is not to be limited to batch processes.

The prepared fruits or vegetables are then subjected to the application of vacuum pressure at a preset level below atmospheric pressure. After the desired degree of vacuum pressure has been attained, the outer surfaces of the fruits or vegetables are wetted by liquid applied to them either by sprays or by surface roller applicators or by both. The application of liquid is continued as the vacuum pressure is released to return the pressure surrounding the produce to atmospheric conditions. Release of vacuum pressure is prolonged to assist in infiltrating the skins or covers of the produce and to attain the desired degree of liquid penetration about their outer surfaces.

In the case of apples, immediate visual inspection of the fruits will verify waterlogging at the pores that naturally occur in the skin of the fruit. This indicates that liquid infiltration of the treatment solution has taken place. The liquid disperses within a matter of hours and the normal outward appearance of the fruit then reappears. In the case of calcium treatment of apples, infiltration results in improved firmness and greater resistance to bruising and decay during normal storage conditions.

The apparatus shown in FIGS. 1 through 3 basically comprises a sealed pressure vessel 10 having a hinged cover 11. When closed, the cover 11 is retained across the open forward end of vessel 10 by a releasable latch shown generally at 12. The vessel 10 is supported on a rigid stationary stand shown at 13.

Fresh produce, illustrated generally by apples 14 (FIG. 3), is supported within the interior of vessel 10 by three rollers 15. The rollers have soft resilient coverings of porous spongy material which is wettable by the treatment liquid that is to be applied to the apples 14. The spongy material might be a porous resin capable of transferring liquid to the surfaces of apples 14, or might consist of a yieldable fabric or fleecy covering, depending upon the required resiliency of the roller cover with respect to the anticipated surface characteristics of the produce being treated. Rollers 15 have a yieldable surface to widen the areas of contact between the rollers and the produce. They also act as liquid transfer means for applying a liquid coating to the produce outer surfaces during release of vacuum pressure within the vessel 10.

The rollers 15, which are arranged in side by side positions in close proximity to one another, support the apples 14 between them. Each roller 15 is rotatable about an individual axis relative to vessel 10. As shown, the roller shafts 16 are journalled on front and rear upright walls 17, 18 fixed within the interior of vessel 10. The roller axes as illustrated are parallel to one another.

In the specific example shown, the central roller 15 is selectively powered by an electric motor 20 mounted to the outside of cover 11. The motor shaft 21 has a dual pin coupling 22 which is complementary to a transverse bar 23 fixed across the front end of the central roller 15 shaft 16. When the cover 11 is closed, the pins of coupling 22 interfit with the bar 23 to complete a drive conconnection between the coaxial motor shaft 21 and central roller shaft 16.

While all three rollers 15 could be driven in unison, the illustrated side rollers are turned about their respective axes due to frictional engagement with the interposed apples 14. The rollers 15 will rotate in substantial unison and in the same direction to thereby roll the individual apples 14 that span their yieldable surfaces.

The apples 14 rest loosely on the upper surfaces of the rollers 15. The lower surfaces of rollers 15 are submerged within a liquid sump, which is defined by the lower portions of vessel 10 and by a front stationary bulkhead shown at 24. The design liquid level 25 within the sump is at an elevation above and slightly overlapping the lowermost portions of the rollers 15. Thus, the surfaces of rollers 15 will be wetted by rotational passage through the liquid bath prior to contact between the wetted surfaces and the exterior of the apples 14. Rollers 15 constantly turn and wet the exterior surfaces of produce resting upon them when motor 20 is operational. When motor 20 is stationary, the rollers 15 serve as a support maintaining the produce above the liquid level 25. This prevents abnormal absorption of liquid into the produce, which sometimes occurs when they are submerged during application of external pressure.

A second form of liquid applicator included within vessel 10 is illustrated as a longitudinal series of spray nozzles 26 arranged along an interior spray tube 27. As used herein, the term "spray" shall include fogs, mists or any other type of atmospheric dispersal pattern by which droplets of liquid might be directed onto the produce within vessel 10. This liquid application again is achieved without immersing the produce within a bath of liquid, thereby achieving more uniform liquid application about the entire outer surface of the product.

The spray tube 27 is supplied with liquid from the output 28 of a recirculating liquid pump 30 mounted-on the stand 13. The inlet 31 of pump 30 is in open communication with the liquid sump at the bottom of vessel 10 and recirculates liquid between the bath that wets rollers 15 and the spray nozzles 26.

A semicircular vacuum conduit 32 is fixed within the interior of vessel 10, being curved to fit inwardly adjacent to the vessel walls at a location adjacent the vessel front opening. This conduit 32 leads to an exterior hose shown at 33 connected to a vacuum pump or other source of vacuum pressure 34. The upper end of conduit 32 is open to permit evacuation of air or gas from the vessel 10 by application of vacuum pressure to its interior.

To infiltrate the surfaces of fruit or vegetables by operation of this apparatus, one first must fill the liquid sump within vessel 10 to the desired liquid level shown at 25, which is above the lowermost surfaces of the rollers 15. The apples or other produce are then placed between rollers 15 and the cover 11 is shut and sealed. Vacuum is applied through conduit 33 to decrease the pressure within vessel 10 to a desired level. Exemplary pressures usable in this system would be on the order of 200 to 300 milimeters of mercury.

After reaching the desired vacuum pressure level the vacuum pressure is maintained as motor 20 and pump 30 are activated to turn the rollers 15 and pressurize the spray nozzles 26, respectively. The rollers 15 wet the lowermost outer surfaces of the produce in contact with them and the sprays 26 wet its upwardly facing surfaces. This is preferably accomplished simultaneously, but it is to be understood that the rollers might be used alone, or the sprays might be used alone under certain circumstances. The use of either form of liquid applicator might also be facilitated by use of a surfactant or a liquid capable of "wetting" the surfaces of the produce.

As soon as the spray and/or rollers are activated, release of vacuum pressure can be initiated to gradually return the pressure within vessel 10 to atmospheric level. The rate of release of the vacuum pressure is readily controllable by conventional valves 35 interposed within the hose 33. Such controls are well known and no further discussion of their details is believed to be necessary for an understanding of this disclosure.

The initial application of vacuum pressure will draw out air or gas from the interior spaces within the cellular structure of the produce. As the pressure within vessel 10 is increased, the air or gas returning to the interior of the produce will draw liquid with it and force the liquid through the skin pores to infiltrate the exterior surfaces. The liquid will carry with it any active soluble materials dissolved with it. Examples might include calcium chloride, potassium or sodium ascorbate, plant hormones, such as gibberllic acid, or plain water (to increase moisture content). It is to be understood that any food grade material can be infiltrated by this system for any suitable chemical purpose, such as use a fungicide, insecticide, coloring agent, preservative, or taste modifier.

As a specific example of operating parameters relating to the system, Golden Delicious apples were treated after being freshly picked or harvested. They were washed first in plain water to remove surface dust and spray residues. They were loaded onto the rollers with the apparatus maintained at room temperature and the apples themselves having been stabilized at room temperature (approximately 70° F.).

The vessel cover was then closed and vacuum pressure was applied to a level of 200 to 300 milimeters of mercury. It was maintained for about two to three minutes to assure evacuation of air from the apple interiors. A two to four percent (by weight) calcium chloride solution was then applied to each apple by simultaneous by use of rotating support rollers and overhead spray nozzles. After initiating liquid application, the vacuum pressure was released over a period of two to five minutes. Waterlogging was visually present about the individual pores at the apple surfaces, but these visual indicators disappeared within a day or two as the liquid dispersed into the fruit. Weighing of the apples before and after the treatment confirmed the addition of liquid to them as shown by a detectable weight gain.

Citrus fruits have also been infiltrated by the system, which has been used for addition of ascorbates to limes, lemons and grapefruit. It has been found desirable to prick the skins of citrus fruit or other thick-skinned fruits or vegetables prior to this treatment in order to impregnate them despite waxy surface constituents or a skin structure which is not readily permeated. Tests have also been conducted with respect to infiltration of tomatoes, which are best covered with liquid by sprays. More uptake of the liquid did result through the stem attachment area in the tomatoes, but the infiltration was generally effective.

The rate of infiltration and resulting degree of infiltration finally achieved is a function of temperature, pressure, concentration of active materials in the treating solution, and the rate of vacuum pressure release. The degree of infiltration can be increased in proportion to the vacuum level, increases in the rate of vacuum pressure release, increases in the chemical concentration, and increases in temperature.

While the above example illustrates a batch system for treating groups of product, it is to be understood that the same system can be applied to a continuous process by using conveyor rollers or other conveyor means which move the produce along a path from one operational station to another. For instance, the conveyors or rollers might be loaded at one station. At a subsequent station the produce might be subjected to vacuum pressures. Spray or roller application of liquid might be achieved simultaneously at a subsequent station during release of the vacuum pressure. This can be done during continuous movement of the produce on a suitable conveyor, or during intermittent movement of groups of product from one station to the next.

Having described our invention, we claim:

1. A process for applying food grade liquid material to the interior of whole fresh produce having porous or perforated skin surfaces without submerging said produce in said liquid material, comprising the following steps:

subjecting the produce to a preselected vacuum pressure adequate to evacuate air or gas from the produce interior through its skin surfaces;

coating food grade liquid material onto the exterior skin surfaces of the produce while continuing to subject the produce to the preselected vacuum pressure to thereby wet the skin surfaces with the liquid material; and progressively releasing the vacuum pressure to return the pressure surrounding the produce to atmospheric conditions while further coating the liquid material onto the exterior skin surfaces of the produce without submersion and at a rate which permits the liquid material to be forced through the produce skin surfaces due to the increase in exterior pressure about it.

2. A process as claimed in claim 1 wherein the steps of coating the liquid material onto the exterior skin surfaces of the produce are accomplished through use of a spray.

3. A process as claimed in claim 1 wherein the steps of coating the liquid material onto the exterior skin surfaces of the produce are accomplished by supporting the produce on rotating porous resilient rollers partially immersed within a liquid bath.

4. A process as claimed in claim 1 wherein the steps of coating the liquid material onto the exterior skin surfaces of the produce are accomplished by supporting the produce on rotating porous resilient rollers partially immersed within a liquid bath;

and simultaneously spraying liquid material from the bath onto the produce.

5. A process as claimed in claim 1 wherein the produce is apples and the liquid material is a solution of calcium chloride in water.

* * * * *